(12) United States Patent
O'Docherty

(10) Patent No.: US 6,431,587 B1
(45) Date of Patent: Aug. 13, 2002

(54) INFLATABLE SIDE CURTAIN

(75) Inventor: James K. O'Docherty, Mesa, AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/431,998

(22) Filed: Nov. 2, 1999

(51) Int. Cl.[7] .............................................. B60R 21/24
(52) U.S. Cl. .................................. 280/730.2; 280/729
(58) Field of Search .......................... 250/730.2, 728.1, 250/729, 730.1, 743.1

(56) References Cited

U.S. PATENT DOCUMENTS

| | | | |
|---|---|---|---|
| 5,584,507 A | * 12/1996 | Khandhadia et al. | 280/743.1 |
| 5,630,620 A | 5/1997 | Hirai et al. | 280/743.1 |
| 5,788,270 A | 8/1998 | Haland et al. | 280/729 |
| 5,791,683 A | * 8/1998 | Shibata et al. | 280/730.2 |
| 5,899,491 A | 5/1999 | Tschaeschke | 280/730.2 |
| 6,000,715 A | * 12/1999 | Tshaeschke | 280/730.2 |
| 6,022,044 A | * 2/2000 | Cherry | 280/730.2 |
| 6,056,316 A | * 5/2000 | Yamaji et al. | 280/730.2 |
| 6,082,761 A | * 7/2000 | Kato et al. | 280/730.2 |
| 6,095,551 A | * 8/2000 | O'Docherty | 280/730.2 |
| 6,113,141 A | * 9/2000 | Baker | 280/743.2 |
| 6,129,377 A | * 10/2000 | Okumura et al. | 280/730.2 |
| 6,135,492 A | * 10/2000 | Zimmerbeutel et al. | 280/730.2 |
| 6,135,493 A | * 10/2000 | Jost et al. | 280/730.2 |
| 6,142,520 A | * 11/2000 | Iino et al. | 280/743.1 |
| 6,152,481 A | * 11/2000 | Webber et al. | 280/730.2 |
| 6,199,898 B1 | * 3/2001 | Masuda et al. | 280/730.2 |
| 6,220,629 B1 | * 4/2001 | Wipasuramonton et al. | 280/743.1 |

FOREIGN PATENT DOCUMENTS

DE     19743626     9/1998

* cited by examiner

Primary Examiner—J. J. Swann
Assistant Examiner—J. Allen Shriver
(74) Attorney, Agent, or Firm—Tarolli, Sundheim, Covell, Tummino & Szabo L.L.P.

(57) ABSTRACT

Apparatus (10) for helping to protect an occupant of a vehicle (12) that has a side structure (16) and a roof (18) comprises an inflatable vehicle occupant protection device (14). The vehicle occupant protection device (14) is inflatable away from the vehicle roof (18) into a position between the side structure (16) of the vehicle (12) and a vehicle occupant. An inflation fluid source (24) provides inflation fluid for inflating the vehicle occupant protection device (14). The vehicle occupant protection device (14) comprises first and second gas impermeable panels (40 and 42). Stitching (44) extends into the first and second panels (40 and 42) and secures portions of the panels together. A first gas impermeable piece (70) is secured to the first panel (44) in a position overlying the stitching (44) in the first panel.

15 Claims, 3 Drawing Sheets

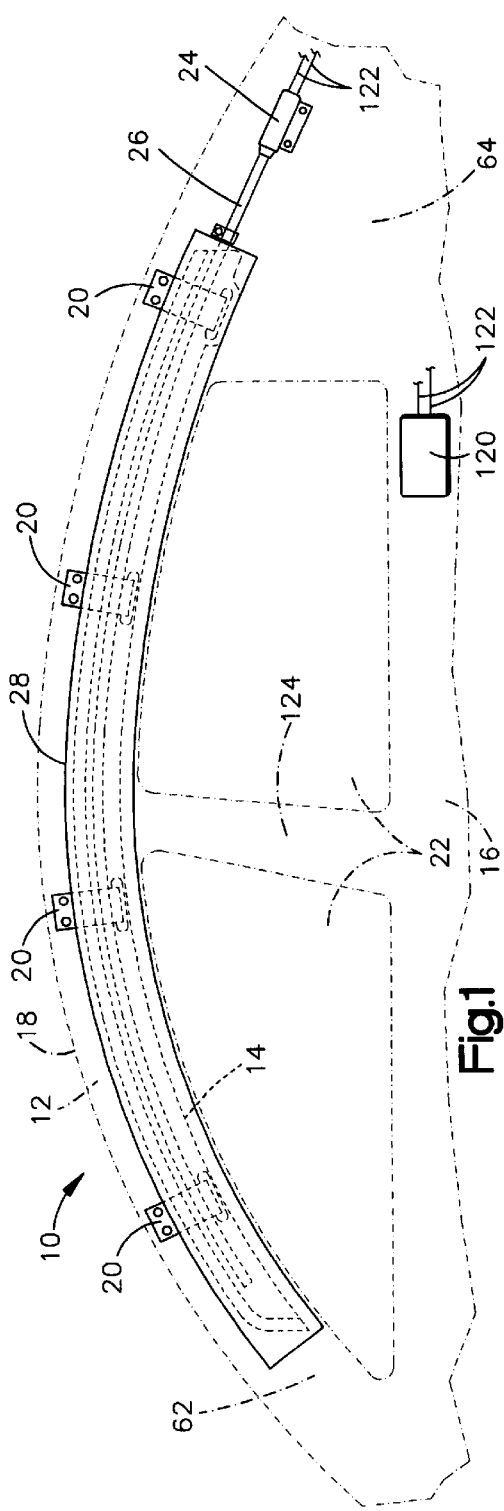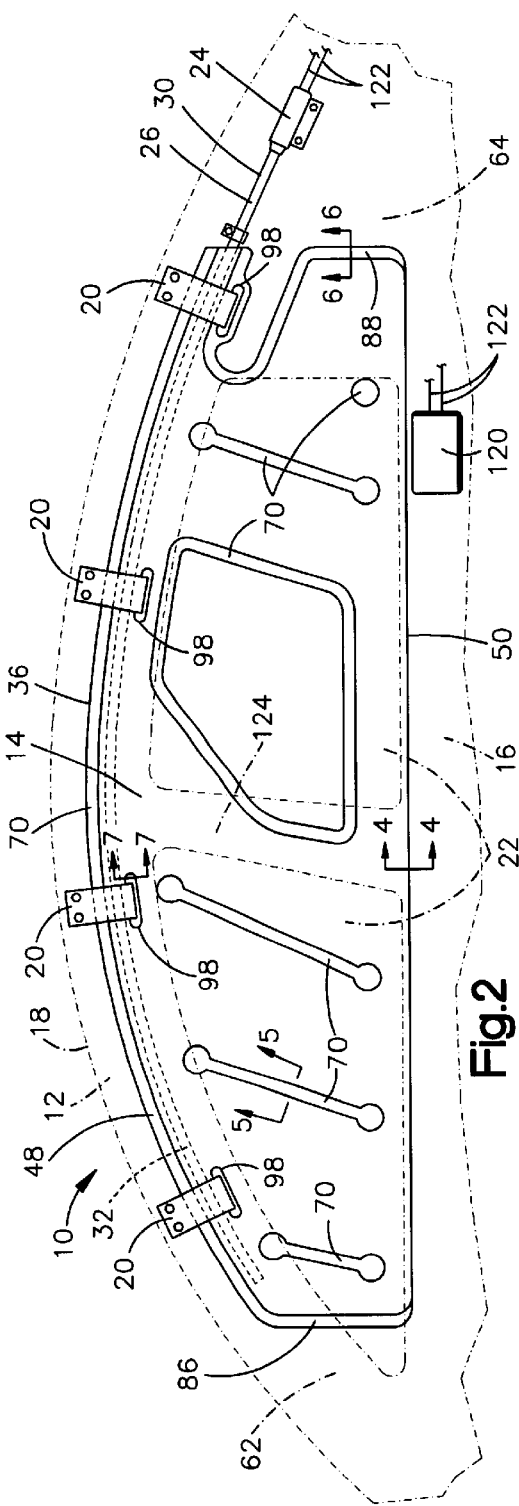

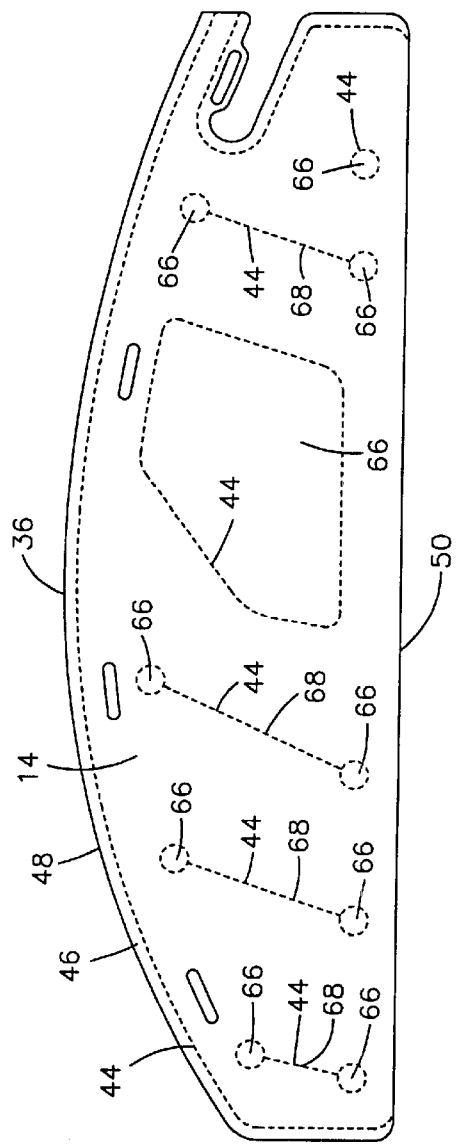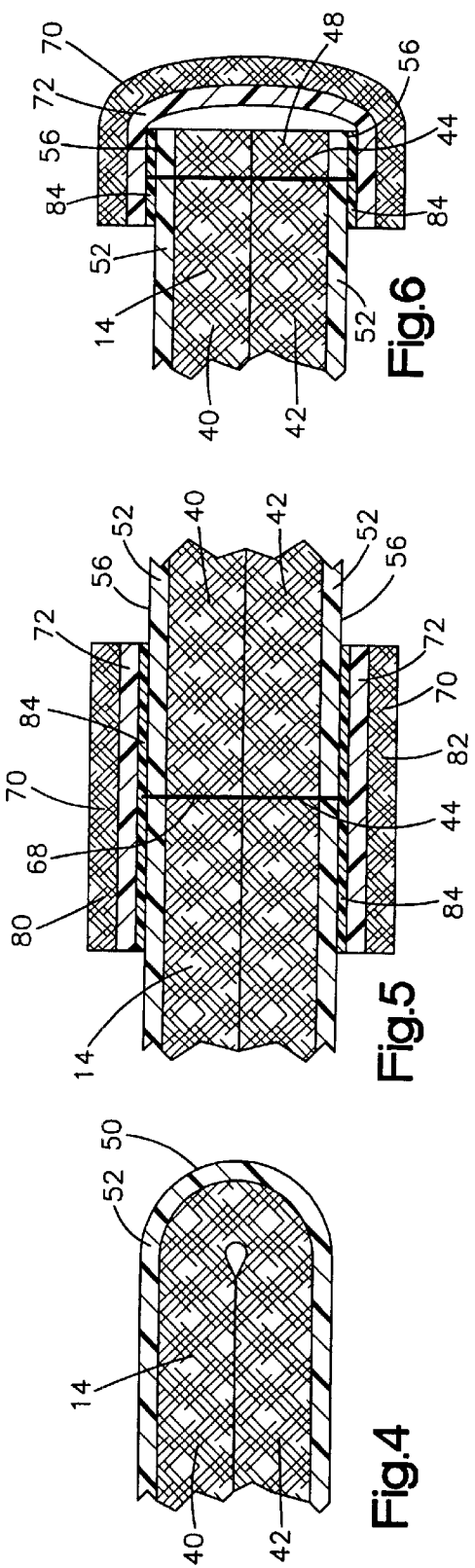

INFLATABLE SIDE CURTAIN

FIELD OF THE INVENTION

The present invention relates to an inflatable vehicle safety apparatus for helping to protect a vehicle occupant in the event of a side impact to a vehicle and/or a vehicle rollover.

BACKGROUND OF THE INVENTION

It is known to inflate a vehicle occupant protection device to help protect a vehicle occupant in the event of a vehicle collision. One particular type of inflatable vehicle occupant protection device is an inflatable curtain that inflates from the roof of the vehicle downward inside the passenger compartment between a vehicle occupant and the side structure of the vehicle in the event of a side impact or rollover. Such an inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle that has a side structure and a roof. The apparatus includes an inflatable vehicle occupant protection device that is inflatable away from the vehicle roof into a position between the side structure of the vehicle and a vehicle occupant. An inflation fluid source provides inflation fluid for inflating the vehicle occupant protection device. The vehicle occupant protection device comprises first and second gas impermeable panels. Stitching extends into the first and second panels and secures portions of the panels together. A first gas impermeable piece is secured to the first panel in a position overlying the stitching in the first panel.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an inflatable vehicle safety apparatus illustrating the safety apparatus in a deflated condition;

FIG. 2 is a schematic view of the vehicle safety apparatus of FIG. 1 in an inflated condition;

FIG. 3 is an elevational view of a side curtain portion of the vehicle safety apparatus, with certain parts omitted;

FIG. 4 is an enlarged sectional view of the vehicle safety apparatus taken generally along line 4—4 in FIG. 2;

FIG. 5 is an enlarged sectional view of the vehicle safety apparatus taken generally along line 5—5 in FIG. 2;

FIG. 6 is an enlarged sectional view of the vehicle safety apparatus taken generally along line 6—6 in FIG. 2;

DESCRIPTION OF PREFERRED EMBODIMENT

Figure 7:
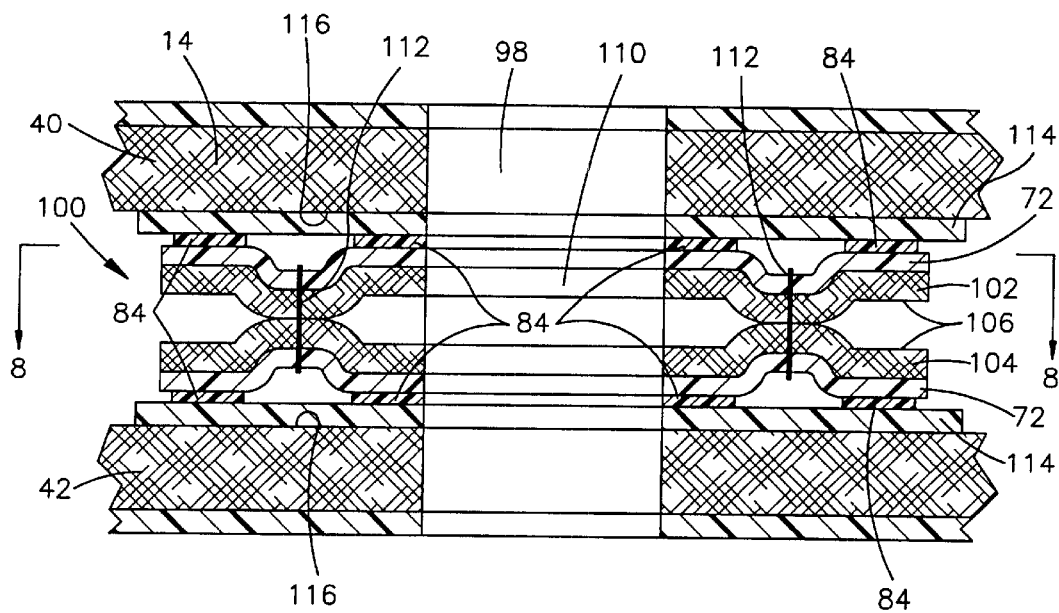
FIG. 7 is an enlarged sectional view of the vehicle safety apparatus taken generally along line 7—7 in FIG. 2.

As representative of the present invention, a vehicle safety apparatus 10 helps to protect an occupant of a vehicle 12. As shown in FIGS. 1 and 2, the safety apparatus 10 includes a vehicle occupant protection device in the form of an inflatable curtain 14, which is mounted adjacent to the side structure 16 of the vehicle 12 and the vehicle roof 18. The side structure 16 of the vehicle 12 includes side windows 22. An inflator 24 is connected in fluid communication with the inflatable curtain 14 through a fill tube 26. Securing hardware 20, such as clamps or brackets, secures the inflatable curtain 14 and the fill tube 26 to the side structure 16 of the vehicle 12.

The fill tube 26 has a first end portion 30 (FIG. 2) for receiving fluid from the inflator 24. The fill tube 26 has a second end portion 32 that is disposed in the inflatable curtain 14 along a top edge 36 of the curtain. The second end portion 32 of the fill tube 26 has a plurality of openings (not shown) that provide fluid communication between the fill tube 26 and the inflatable curtain 14.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid.

The safety apparatus 10 includes a housing 28 (FIG. 1) that stores the inflatable curtain 14 in a deflated condition. The fill tube 26, the deflated inflatable curtain 14, and housing 28 have an elongated configuration and extend along the vehicle roof 18 and along the side structure 16 of the vehicle 12 above the side windows 22.

As best illustrated in FIGS. 4–6, the inflatable curtain 14 comprises first and second panels 40 and 42 that are arranged in an overlying manner. Overlapping portions of the first and second panels 40 and 42 are secured together by stitching 44 (FIG. 3), which forms a seam 46 that extends along a portion of the periphery 48 of the panels. In the illustrated embodiment, the inflatable curtain 14 is formed from a sheet of material that is folded over along a bottom edge 50 of the curtain, opposite the top edge 36, to form the overlying first and second panels 40 and 42 (FIG. 4). It will be recognized by those skilled in the art, however, that the inflatable curtain 14 may have alternate constructions. For example, the first and second panels 40 and 42 could be formed from separate sheets of material arranged in an overlying manner and secured together by stitching 44 along the entire periphery 48 of the panels to form the inflatable curtain 14.

The first and second panels 40 and 42 (FIG. 5) are constructed of a material, such as a fabric, that is coated on at least one side with a gas impermeable coating 52, such as a urethane coating. The first and second panels 40 and 42 are arranged such that the coating 52 defines an outer surface 56 of the inflatable curtain 14.

As illustrated in FIG. 3, overlying parts of the first and second panels 40 and 42 may be secured together, by stitching 44, at desired locations within the periphery of the inflatable curtain 14. The stitching 44 forms non-inflatable portions 66 and secured together segments 68 of the inflatable curtain 14. It will be recognized by those skilled in the art that the non-inflatable portions 66 and segments 68 of the inflatable curtain 14 may be arranged in various configurations. For example, the number of portions 66 and segments 68 could be increased or decreased and the shape, size and location of the portions and segments could be changed.

As illustrated in FIG. 2, gas impermeable pieces 70 overlie the stitching 44, illustrated in FIG. 3, that forms the seam 46, the non-inflatable portions 66 and the segments 68 of the inflatable curtain 14. The gas impermeable pieces 70 (FIGS. 5 and 6) consist of a material, such as a fabric, that is coated on at least one side with a gas impermeable coating 72, such as a urethane. The materials used to construct the gas impermeable pieces 70 may be identical or similar to the materials used to construct the first and second panels 40 and 42 of the inflatable curtain 14.

As illustrated in FIG. 5, the gas impermeable pieces 70 overlie the stitching 44 that forms a linked segment 68. It will be recognized by those skilled in the art that an identical configuration may also be used to overlie the stitching 44 that forms the non-inflatable portions 66 (FIG. 3) of the inflatable curtain 14. A first gas impermeable piece 80 (FIG. 5) overlies the stitching 44 on the first panel 40, and a second gas impermeable piece 82 overlies the stitching 44 on the second panel 42. The first and second gas impermeable pieces 80 and 82 are arranged such that the gas impermeable coatings 72 of the pieces are positioned adjacent to the gas impermeable coatings 52 of the first and second panels 40 and 42, respectively.

The first and second gas impermeable pieces 80 and 82 are connected to the first and second panels 40 and 42, respectively, by a radio frequency weld 84. The radio frequency weld 84 bonds the gas impermeable coating 52 on the first panel 40 to the coating 72 on the first piece 80, and bonds the coating 52 on the second panel 42 to the coating 72 on the second piece 82. The radio frequency weld 84 surrounds the stitching 44 on the outer surface 56 of the inflatable curtain 14 and forms an airtight seal around the stitching.

The radio frequency welding process melts at least a portion of the coatings 52 and 72 and combines or fuses the coatings to form the radio frequency weld 84. For clarity, in the figures, the radio frequency weld 84 is shown schematically as a layer between the coatings 52 and 72. The radio frequency weld 84, however, is actually a blend or mixture of at least a portion of the coatings 52 and 72.

As illustrated in FIG. 6, a gas impermeable piece 70 overlies adjacent portions of the first and second panels 40 and 42 that are secured by stitching 44 along the periphery 48 of the inflatable curtain 14. The gas impermeable piece 70 has a length that extends along the top edge 36 (FIG. 2), a front edge 86 and a rear edge 88 of the inflatable curtain 14.

The gas impermeable piece 70 (FIG. 6) has a width, measured transverse to the length, that wraps around the first and second panels 40 and 42 along the top edge 36 (FIG. 2), front edge 86 and rear edge 88 of the inflatable curtain 14. The gas impermeable piece 70 is arranged such that the gas impermeable coating 72 of the piece is positioned adjacent to the gas impermeable coating 52 of the first and second panels 40 and 42.

The gas impermeable piece 70 is connected to the first and second panels 40 and 42 by a radio frequency weld 84. The radio frequency weld 84 bonds the gas impermeable coating 52 on the first and second panels 40 and 42 to the gas impermeable coating 72 on the gas impermeable piece 70. The radio frequency weld 84 surrounds the stitching 44 on the outer surface 56 of the inflatable curtain 14 and forms an airtight seal around the stitching.

Figure 8:
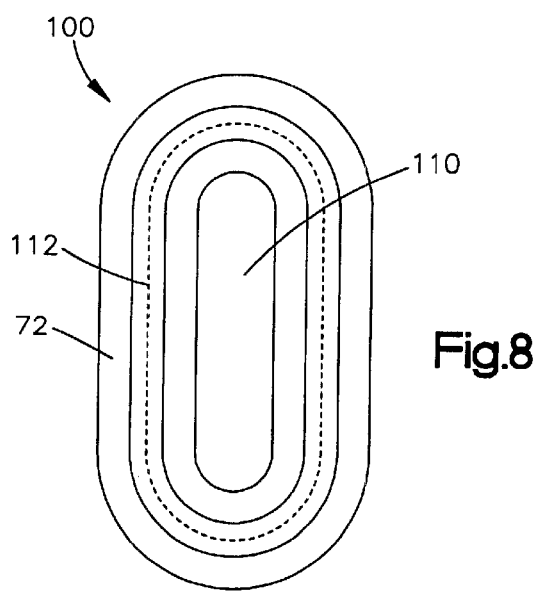
FIG. 8 is a sectional view of the vehicle safety apparatus taken generally along line 8—8 in FIG. 7.

The securing hardware 20 (FIG. 2) extends through apertures 98 that are spaced along the top edge 36 of the inflatable curtain 14. As illustrated in FIGS. 7 and 8, an aperture reinforcing structure 100 consists of third and fourth pieces 102 and 104, which are arranged in an overlying manner with uncoated surfaces 106 of the pieces positioned adjacent to each other and the coating 72 facing outward. The aperture reinforcing structure 100 has an oval or generally elongated circular shape and includes an aperture 110 that extends through the third and fourth pieces 102 and 104. The third and fourth pieces 102 and 104 are connected to each other by stitching 112, which encircles the aperture 110.

The aperture reinforcing structure 100 is positioned between the first and second panels 40 and 42 with the aperture 110 in the seal in alignment with the aperture 98 in the inflatable curtain 14. In the illustrated embodiment, a portion of each of the first and second panels 40 and 42 is coated with a layer of gas impermeable coating 114, which surrounds the apertures 98 on inner surfaces 116 of the panels. It will be recognized by those skilled in the art that the entire inner surface 116 of the first and second panels 40 and 42 may also be coated with the gas impermeable coating 114.

The aperture reinforcing structure 100 is connected to the inflatable curtain 14 by a radio frequency weld 84. The radio frequency weld 84 bonds the gas impermeable coating 114 on the first panel 40 to the coating 72 on the third piece 102, and bonds the coating 114 on the second panel 42 to the coating 72 on the fourth piece 104. The radio frequency weld 84 surrounds the aperture 98 and forms an airtight seal around the aperture.

Those skilled in the art will recognize that the aperture reinforcing structure 100 may have alternate constructions. For example, in the illustrated embodiment, the aperture reinforcing structure 100 is connected to the first and second panels 40 and 42 by the radio frequency weld 84, alone. It may be desirable, however, to secure the aperture reinforcing structure 100 to the first and second panels 40 and 42 in a manner such that a stronger connection is provided. In this instance, the stitching 112 may extend through the third and fourth pieces 102 and 104 and through the first and second panels 40 and 42. Also, it may be desirable to provide a gas impermeable coating on both sides of the third and fourth pieces 102 and 104 such that a radio frequency weld that surrounds the stitching 112 between the pieces can be provided.

The vehicle 12 includes a sensor mechanism 120 (shown schematically in FIGS. 1 and 2) for sensing a side impact to the vehicle 12 and/or a rollover of the vehicle 12. The sensor mechanism 120 actuates the inflator 24 in response to the sensing of a side impact or a vehicle rollover.

In the event of a rollover of the vehicle or a side impact to the vehicle 12 of a magnitude greater than a predetermined threshold value, the sensor mechanism 120 provides an electrical signal over lead wires 122 to the inflator 24. The electrical signal causes the inflator 24 to be actuated in a known manner. The inflator 24 discharges fluid under pressure into the fill tube 26. The fill tube 26 directs the fluid into the inflatable curtain 14.

The inflatable curtain 14 inflates under the pressure of the inflation fluid from the inflator 24. The housing 28 (FIG. 1) opens and the inflatable curtain 14 (FIG. 2) inflates away from the roof 18, in a downward direction as shown in the drawings and with respect to the direction of forward travel of the vehicle 12, into the position illustrated in FIG. 2.

When the inflatable curtain 14 is in the inflated condition, the first panel 40 is positioned adjacent the side structure 16 (FIG. 2) of the vehicle 12. The top edge 36 of the inflatable curtain 14 is positioned adjacent to the intersection of the roof 18 and the side structure 16 of the vehicle 12. The front edge 86 of the inflatable curtain 14 is positioned adjacent to an A pillar 62 of the vehicle 12. The rear edge 88 of the inflatable curtain 14 is positioned adjacent to a C pillar 64 of the vehicle 12.

The inflatable curtain 14, when inflated, extends along the side structure 16 of the vehicle 12 and is positioned between the side structure and any occupant of the vehicle. In the inflated condition, the inflatable curtain 14 extends between the A pillar 62 and the C pillar 64 of the vehicle 12 and overlies at least a portion of the A pillar, C pillar, and a B pillar 124 of the vehicle. The inflatable curtain 14, when inflated, helps to protect a vehicle occupant in the event of a vehicle rollover or a side impact to the vehicle 12.

The gas impermeable pieces 70 help block inflation fluid from leaking through the stitching 44. The aperture seals 100 help block inflation fluid from leaking through the apertures 98. The inflatable curtain 14 thus has a substantially airtight construction. This helps to ensure that the inflatable curtain 14 will remain inflated throughout the duration of a side impact to the vehicle 12 and/or a vehicle rollover.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle that has a side structure and a roof, said apparatus comprising:

a vehicle occupant protection device that is inflatable away from the vehicle roof into a position between the side structure of the vehicle and the vehicle occupant; and an inflation fluid source that provides inflation fluid for inflating said vehicle occupant protection device;

said vehicle occupant protection device comprising first and second gas impermeable panels, said first and second panels having aligned openings extending through said first and second panels respectively, said openings being for receiving hardware for securing said panels in the vehicle, and a structure for reinforcing said openings in said first and second panels, said structure comprising third and fourth fabric pieces sewn to each other, said third and fourth fabric pieces having openings aligned with the openings in said first and second panels, said third and fourth fabric pieces being secured to facing internal surfaces of said first and second panels, said third and fourth fabric pieces having outwardly facing gas impermeable coatings positioned adjacent said facing internal surfaces of said first and second panels.

2. Apparatus as defined in claim 1 wherein said vehicle occupant protection device is an inflatable curtain having a stored position extending along the side structure adjacent to the roof of the vehicle, said inflatable curtain being inflated away from the vehicle roof into said position between the side structure of the vehicle and the vehicle occupant.

3. Apparatus as defined in claim 1 wherein said facing internal surfaces of said first and second panels are at least partially coated and said third and fourth fabric pieces are at least partially coated, and further including radio frequency welds securing said third and fourth fabric pieces to said respective facing internal surfaces of said first and second panels, each of said welds comprising at least a portion of said coatings on said internal panels of said first and second panels and on said third and fourth fabric pieces which are bonded together.

4. Apparatus as defined in claim 3 further comprising stitching extending into said first and second panels for securing portions of said panels together, and a first gas impermeable piece overlying said stitching in said first panel.

5. Apparatus as defined in claim 4 further including a second gas impermeable piece secured to said second panel in a position, overlying said stitching in said second panel.

6. Apparatus for helping to protect an occupant of a vehicle that has a side structure and a roof, said apparatus comprising:

a vehicle occupant protection device that is inflatable away from the vehicle roof into a position between the side structure of the vehicle and the vehicle occupant; and an inflation fluid source that provides inflation fluid for inflating said vehicle occupant protection device;

said vehicle occupant protection device comprising first and second gas impermeable panels, stitching extending into said first and second panels for securing portions of said panels together, and a first gas impermeable piece secured to said first panel in a position overlying said stitching in said first panel each of said first and second panels having a periphery, said stitching extending into said first and second panels adjacent the peripheries of said first and second panels to secure the peripheries together, and said first piece comprising a folded piece having a first portion overlying the stitching in said first panel and a second portion overlying the stitching in said second panel.

7. Apparatus for helping to protect an occupant of a vehicle that has a side structure and a roof, said apparatus comprising:

an inflatable vehicle occupant protection device that is inflatable away from the vehicle roof into a position between the side structure of the vehicle and the vehicle occupant and an inflation fluid source that provides inflation fluid for inflating said inflatable vehicle occupant protection device, said inflatable vehicle occupant protection device comprising:

first and second overlying panels having a gas impermeable coating on an outer surface of said first and second panels, stitching extending through said first and second panels and through said gas impermeable coating of said first and second panels to secure portions of said first and second panels together, said stitching having portions exposed on the outer surface of said first and second panels, and at least one piece of material having a gas impermeable coating, said at least one piece of material being secured to at least one of said first and second panels in a position overlying said exposed portions of said stitching, said gas impermeable coating of said at least one piece of material engaging said gas impermeable coating of said at least one of said first and second panels, said gas impermeable coating of said at least one piece of material and said gas impermeable coating of said at least one of said first and second panels being melted and combined, said combined gas impermeable coatings surrounding said exposed portions of said stitching and helping to block leakage of said inflation fluid through said stitching when said inflatable vehicle occupant protection device is inflated.

8. Apparatus as defined in claim 7, wherein said at least one piece of material comprises first and second pieces of material, said first piece of material overlying said exposed portions of said stitching on said first panel, said gas impermeable coating of said first piece of material and said gas impermeable coating of said first panel being melted and combined to help block leakage of said inflation fluid through said stitching, said second piece of material overlying said exposed portions of said stitching on said second panel, said gas impermeable coating of said second piece of material and said gas impermeable coating of said second panel being melted and combined to help block leakage of said inflation fluid through said stitching.

9. Apparatus as defined in claim 7, wherein said gas impermeable coating of said at least one piece of material and said gas impermeable coating of said at least one of said first and second panels being melted and combined by radio frequency welding.

10. Apparatus as defined in claim 7 wherein each of said first and second panels has a periphery, said stitching extending through said first and second panels adjacent the peripheries of said first and second panels to secure the peripheries together, said at least one piece of material comprising a folded piece of material having a first portion overlying said exposed portions of said stitching in said first panel and a second portion overlying said exposed portions of said stitching in said second panel.

11. Apparatus as defined in claim 7, wherein said vehicle occupant protection device is an inflatable curtain having a stored position extending along the side structure adjacent to the roof of the vehicle, said inflatable curtain being inflated away from the vehicle roof into said position between the side structure of the vehicle and the vehicle occupant.

12. Apparatus as defined in claim 7 wherein each of said first and second panels has a periphery, and said stitching and said at least one piece of material are spaced apart from the peripheries of said first and second panels.

13. Apparatus as defined in claim 7 wherein said first and second panels have aligned openings extending through the first and second panels respectively, said openings being for receiving hardware for securing said panels in the vehicle.

14. Apparatus as defined in claim 13 further including a structure for reinforcing said openings in said first and second panels, said structure comprising third and fourth fabric pieces sewn to each other, said third and fourth fabric pieces having openings aligned with said openings in said first and second panels, said third and fourth pieces being secured to facing internal surfaces of said first and second panels.

15. Apparatus as defined in claim 14 wherein said facing internal surfaces of said first and second panels are at least partially coated and said third and fourth fabric pieces are at least partially coated, and further including radio frequency welds securing said third and fourth fabric pieces to said respective facing internal surfaces of said first and second panels, each of said welds comprising at least a portion of said coatings on said internal surfaces of said first and second panels and said coatings on said third and fourth fabric pieces which are bonded together.

\* \* \* \* \*